Figure 1:
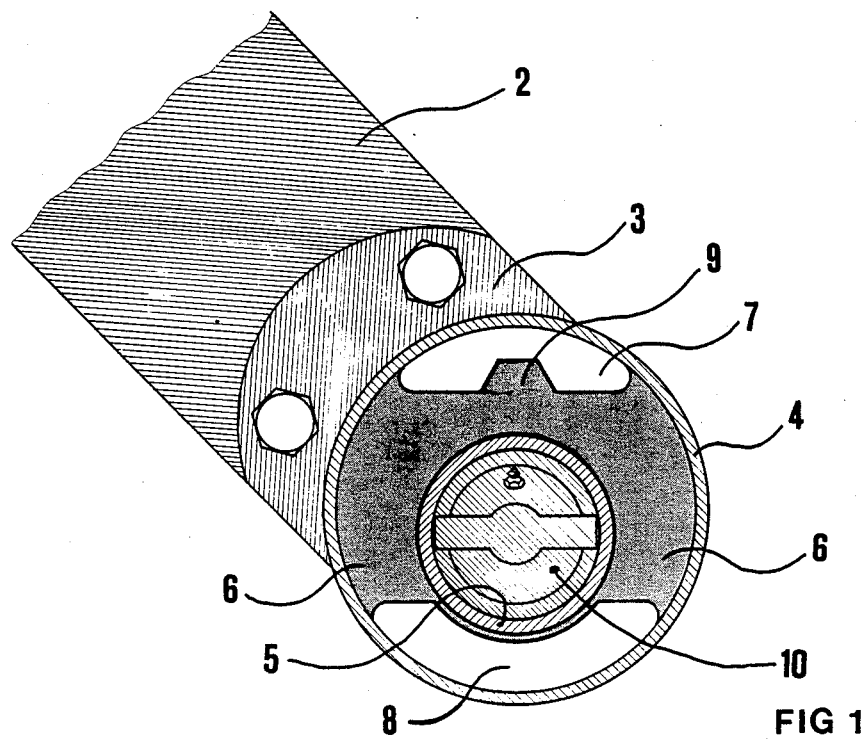

United States Patent [19]

Stark

[11] Patent Number: 4,905,771
[45] Date of Patent: Mar. 6, 1990

[54] SUSPENSION UNIT FOR AGRICULTURAL ROLLERS

[76] Inventor: Crister K. G. Stark, Axtavagen, S-59600 Skänninge, Sweden

[21] Appl. No.: 348,571
[22] PCT Filed: Nov. 20, 1987
[86] PCT No.: PCT/SE87/00549
   § 371 Date: Apr. 19, 1989
   § 102(e) Date: Apr. 19, 1989
[87] PCT Pub. No.: WO88/04133
   PCT Pub. Date: Jun. 16, 1988

[30] Foreign Application Priority Data

Dec. 2, 1986 [SE] Sweden ............................ 8605151

[51] Int. Cl.⁴ .......................................... A01B 29/00
[52] U.S. Cl. ................................ 172/572; 172/537; 267/292; 280/716
[58] Field of Search ............... 172/518, 519, 537, 539, 172/570-573, 705, 707; 267/141, 141.2, 141.3, 153, 292; 404/122; 280/483, 485, 716

[56] References Cited

U.S. PATENT DOCUMENTS

| | | | |
|---|---|---|---|
| 1,190,257 | 7/1916 | Henderson | 172/548 |
| 2,796,712 | 6/1957 | Miller et al. | 172/537 X |
| 4,223,742 | 9/1980 | Stark | 172/537 X |
| 4,471,935 | 9/1984 | Chiba et al. | 267/141.2 X |
| 4,700,934 | 10/1987 | Andrä et al. | 267/141.2 X |

FOREIGN PATENT DOCUMENTS

| | | | |
|---|---|---|---|
| 261281 | 4/1968 | Austria | 172/573 |
| 2703038 | 7/1978 | Fed. Rep. of Germany | |
| 2755117 | 6/1979 | Fed. Rep. of Germany | |
| 36994 | 7/1968 | Finland | 172/537 |

Primary Examiner—Randolph A. Reese
Assistant Examiner—Jeffrey L. Thompson
Attorney, Agent, or Firm—Dowell & Dowell

[57] ABSTRACT

A suspension unit in agricultural rollers, for elastically connecting the frame of the roller to a roller set including a shaft and a plurality of roller rings. An outer axially extending housing (4) is connected to the frame (2) of the roller (1) with the aid of an attachment (3). An inner mounting (5) carries the end of the roller set shaft. On either side of the inner mounting (5) there are axialy arranged horizontal abutments (6), of elastic material, e.g. rubber, connecting the housing (4) to the mounting (5). Through openings (7, 8) are formed at the upper side (7) and under side (8) of the inner mounting. There is thus obtained low stiffness vertically, and the inner mounting (5) is allowed large movement vertically, whereby the roller set is given great adaptability to ground irregularities. By having large stiffness in the horizontal direction, the roller set is only allowed small movement in the travelling direction of the roller.

10 Claims, 1 Drawing Sheet

SUSPENSION UNIT FOR AGRICULTURAL ROLLERS

The present invention relates to an agricultural roller comprising at least two sections with a frame member mounting a set of rotatable rollers composed of a shaft carrying a plurality of roller rings and suspension units one being provided at either end of each roller set in order that the ends of the set be permitted a large but limited movement in a direction A perpendicular to the ground working or travelling direction, the suspension units being independent from one another so as to adapt each roller set to ground irregularities, whereas the movement of the roller set ends in directions perpendicular to the said direction A is restricted. Such an agricultural roller is known from DE-C-28 11 906.

Known suspension units comprise a plurality of parts, which often have a complicated shape or are expensive to manufacture. Such drawbacks are avoided by the invention, which provides an elastic unit in a very simple and cheap manner, and is achieved by the distinguishing features disclosed in the accompanying claims.

Figure 2:
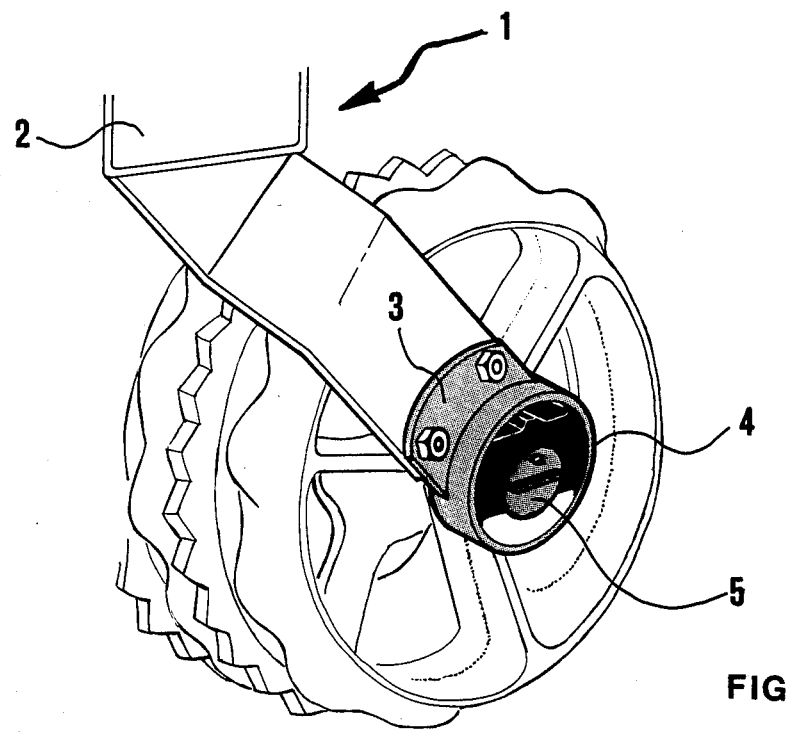

The invention will now be described in more detail and with reference to the accompanying drawing, where FIG. 1 illustrates the unit from one side and FIG. 2 is a perspective view seen from one side.

In the Figures the numeral 1 denotes a roller, 2 the frame of the roller and 3 an attachment on an outer housing 4. The numeral 5 denotes an inner mounting carrying the outer end of the shaft (10) of the roller set. The numeral 6 denotes two elastic rubber abutments connecting the housing 4 to the inner mounting 5 such that the inner mounting can move inside the outer housing 4 when the roller is in operation. Openings 7 and 8 are made respectively on the upper sides and under sides of the abutments 6. In this way the stiffness of the unit will be less vertically than horizontally.

The roller set can then adapt to ground irregularities without any great movement taking place in the travelling direction.

It has been found that the best result is obtained if the abutments are given an axial extension attaining to 40 to 50% of the diameter of the outer housing.

To mitigate shock forces occurring when rolling over stones or other hard irregularities in the ground, a ridge can be formed at the upper side of the inner mounting 5, this ridge coming into contact with the inner surface of the outer housing 4 after a given movement of the inner mounting 5. This ridge can to advantage be made cuneiform to obtain progressive force.

By placing the inner mounting 5 eccentrically and below the centre of the outer housing 4, the elastic material may be allowed to form a thicker layer between the inner mounting 5 and the ridge 9. There is thus obtained a larger elastic volume between the inner mounting and the ridge so that larger shock energy can be taken up in the movement of the inner mounting 5 towards the housing 4.

Where there are rollers having several sections, where outer sections are folded upwards during transport to reduce the transport width, it is advantageous for the abutments 6 to extend along the entire length of the roller set, since in the folded up position of the sections the entire weight of the roller set, which can attain to several hundred kilograms, is then carried solely by the elastic portions 6 of the suspension unit.

One skilled in the art is capable of implementing a suspension unit in accordance with the invention in several ways within the scope of the claims, depending on the function desired. For example, the opening 7 may be given a V-shape with the apex directed downwards. In such a case there is obtained more elastic material for absorbing shocks and in this connection the ridge 9 can be dispensed with. Other modifications are also possible, the abutments may have shape of two or more pairs having openings in between the pairs.

I claim:

1. An agricultural roller comprising a frame member (2) mounting a rotatable roller comprised of a shaft (10) carrying at least one roller ring and suspension unit, the suspension unit being constructed so that the ends of the shaft are permitted a large but limited movement relative to said frame member in a first direction perpendicular to the ground surface and a relatively small restricted movement relative to said frame member in a second direction parallel to said ground surface, so as to allow the roller to follow ground irregularities, characterized in that each suspension unit comprises:
an outer tube-shaped, axially directed housing (4) having attachments for fastening to said frame member,
an inner tube-shaped, axially directed mounting (5) carrying an end of the shaft (10) of the roller set and disposed within said outer housing,
a bridge (6) generally perpendicular to said first direction and to the axis of the shaft (10) and having opposite abutments of elastic material arranged on either side of the inner mounting and connecting said outer housing and said inner mounting (4,5) but leaving an open space (7,8) within the outer housing above and below said bridge (6).

2. Unit as claimed in claim 1, characterized in that the abutments (6) extend axially along the entire length of the outer housing (4) and inner mounting (5).

3. Unit as claim in claim 1 or 2, characterized in that the inner surface of the outer housing (4) and the outer surface of the inner mounting (5) are both circular-cylindrical.

4. Unit as claimed in claim 3, characterized in that the centre of the inner mounting (5) is eccentrically displaced downwards relative to the centre of the outer housing (4), and that the upper defining surfaces of the elastic abutments (6) are situated above the inner mounting (5).

5. Unit as claimed in claim 1, characterized in that on a portion of the bridge above the inner mounting (5) there is formed an upstanding ridge (9) directed towards the inner surface of the outer housing (4) of elastic material.

6. Unit as claimed in claim 5, characterized in that the ridge (9) has decreasing width towards the inner surface of the outer housing.

7. Unit as claimed in claim 6, characterized in that the ridge (9) is cuneiform.

8. Unit as claimed in claim 1, characterized in that the length of the unit is less than the diameter of the outer housing.

9. Unit as claimed in claim 8, characterized in that the length of the unit is between 40% and 50% of the diameter of the outer housing.

10. An agricultural roller according to claim 1 characterized in that the elastic material of the bridge (6) is rubber.

* * * * *